United States Patent
Van Der Werff et al.

(10) Patent No.: US 11,111,607 B2
(45) Date of Patent: Sep. 7, 2021

(54) PROCESS FOR MAKING HIGH-STRENGTH POLYLACTIC ACID FILAMENT

(71) Applicant: DSM IP Assets B.V., Heerlen (NL)

(72) Inventors: Harm Van Der Werff, Echt (NL); Bengisu Corakci, Echt (NL); Roman Stepanyan, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 16/318,778

(22) PCT Filed: Jul. 21, 2017

(86) PCT No.: PCT/EP2017/068457
§ 371 (c)(1),
(2) Date: Jan. 18, 2019

(87) PCT Pub. No.: WO2018/015528
PCT Pub. Date: Jan. 25, 2018

(65) Prior Publication Data
US 2019/0284726 A1    Sep. 19, 2019

(30) Foreign Application Priority Data

Jul. 21, 2016 (EP) .................................... 16180629

(51) Int. Cl.
*D01F 6/92* (2006.01)
*D01F 6/62* (2006.01)
*D01D 5/06* (2006.01)
*D01D 5/12* (2006.01)
*C08L 67/04* (2006.01)
*C08G 63/08* (2006.01)

(52) U.S. Cl.
CPC ............... *D01F 6/625* (2013.01); *D01D 5/06* (2013.01); *D01D 5/12* (2013.01); *C08G 63/08* (2013.01); *C08J 2367/04* (2013.01); *C08L 67/04* (2013.01); *D10B 2401/063* (2013.01)

(58) Field of Classification Search
CPC ... C08G 63/06; C08G 63/08; Y10T 428/2915; C08L 67/04; D01D 5/088; B29C 48/05; C08J 2367/04
See application file for complete search history.

(56) References Cited

U.S. PATENT DOCUMENTS

2011/0269359 A1    11/2011    Tam et al.

FOREIGN PATENT DOCUMENTS

JP    6-200410    7/1994

OTHER PUBLICATIONS

By Agrawal et al "Advances in the Production of Poly(Lactic Acid) Fibers. A Review", Journal of Macromolecular Science, Part C—Polymer Reviews vol. C43, No. 4, pp. 479-503, 2003, published on Mar. 2003.*
Medeiros et al "Porous Bioactive Nanofibers via Cryogenic Solution Blow Spinning and Their Formation into 3D Macroporous Scaffolds", ACS Biomater. Sci. Eng. 2016, 2, 9, 1442-1449, Publication Date Jul. 19, 2016.*
Hufenus et al "Biodegradable Bicomponent Fibers from Renewable Sources: Melt-Spinning of Poly(lactic acid) and Poly[(3-hydroxybutyrate)-co-(3-hydroxyvalerate)]", Macromol. Mater. Eng. 2012, 297, 75-84, published on Feb. 2012).*
International Search Report for PCT/EP2017/068457, dated Nov. 7, 2017, 4 pages.
Postema et al., "Study of the Drawing Behavior of Poly(L-Lactide) to Obtain High-Strength Fibers", Journal of Applied Polymer Science, vol. 37, No. 8, Apr. 1, 1989, pp. 2351-2369.
Postema et al., "High-Strength Poly(L-Lactide) Fibers by a Dry-Spinning/Hot-Drawing Process. I. Influence of the Ambient Temperature on the Dry-Spinning Process", Journal of Applied Polymer Science, vol. 39, No. 6, Mar. 20, 1990, pp. 1265-1274.
Leenslag et al., "High-strength poly(l-lactide) fibres by a dry-spinning/hot-drawing process", Polymer, vol. 28, No. 10, Sep. 1, 1987, pp. 1695-1702.
Tsuji et al., "Stereocomplex Formation Between Enantiomeric Poly(Lactic Acid). Öviii. Complex Fibers Spun From Mixed Solution of Poly(D-Lactic Acid) and Poly(L-Lactic Acid)", Journal of Applied Polymer Science, vol. 51, No. 2, Jan. 10, 1994, pp. 337-344.

* cited by examiner

Primary Examiner — Gregory Listvoyb
(74) Attorney, Agent, or Firm — Nixon & Vanderhye P.C.

(57) ABSTRACT

The present invention relates to a process for making high-strength polylactic acid elongated object comprising the steps of making a solution of polylactic acid in a solvent at a concentration of 5 to 50 mass %; spinning the solution through a spinplate comprising at least 1 spinhole to form a fluid elongated object; cooling the fluid elongated object with a cooling medium to form a solvent-containing gel elongated object; removing at least partly the solvent from the gel elongated object to form a solid elongated object; and drawing the elongated object while applying a draw ratio of at least 2, to form a high strength PLA elongated object, characterized in that the cooling medium has a temperature $T_q$ of less than 0° C. The present invention also relates to gel-spun elongated objects comprising PLA with an IV in the range of 4-40 dl/g, and having a tenacity in N/tex such that Ten≥0.146*IV, as well as gel-spun elongated object having a tenacity and a filament titer in tex (t) such that Ten≥1.40*t$^{-0.3}$. The invention also relates to articles containing said gel-spun elongated objects.

20 Claims, 1 Drawing Sheet

PROCESS FOR MAKING HIGH-STRENGTH POLYLACTIC ACID FILAMENT

CROSS-REFERENCE TO RELATED APPLICATIONS

This application is the U.S. national phase of International Application No. PCT/EP2017/068457 filed 21 Jul. 2017, which designated the U.S. and claims priority to EP Patent Application No. 16180629.4 filed 21 Jul. 2016, the entire contents of each of which are hereby incorporated by reference.

FIELD

The invention relates to a process for making high-strength polylactic acid elongated objects comprising the steps of making a solution of polylactic acid (PLA), the PLA having an intrinsic viscosity of at least 4 dL/g, in a solvent, wherein the solution has a concentration $c_P$ of 5 to 50 mass % expressed as the mass of PLA per total mass of solution, spinning the solution through a spinplate comprising at least 1 spinhole into an air-gap to form a fluid filament, optionally applying a fluid draw ratio $DR_{fluid}$ to the fluid elongated object, contacting the fluid elongated object with a cooling medium to form a solvent-containing gel elongated object, optionally applying a gel draw ratio $DR_{gel}$ to the gel elongated object, removing at least partly the solvent from the gel elongated object to form a solid elongated object and drawing the elongated object in at least one step during and/or after at least partly removing the solvent, while applying a draw ratio $DR_{solid}$ of at least 2, to form a PLA elongated object.

The invention further relates to a high-strength polylactic acid elongated object and to products containing said elongated object, especially to various kinds of ropes, fabrics and composites.

BACKGROUND AND SUMMARY

A process is known from Postema et al. (Journal of Applied Polymer sciences, Vol. 39, 1265, 1990) whereby the highest tensile strength value recorded for a poly-L-lactic acid (PLLA) fiber was acheived by spinning PLLA with an IV of 12.2 dL/g as a 4 mass % solution in a chloroform-toluene mixture. The 13 times drawn PLLA fiber had a tenacity of 1.70 N/tex with 23% elongation at break. Fambri et al. (Journal of Materials Science: Materials in Medicine, Vol.5, 679-683, 1994), Leenslag et al. (Polymer, Vol.28, 1695-1702, 1987) and Eling et al. (Polymer, Vol.23, 1587-1593, 1982) employed similar processes without achieving the strength of the fiber produced by Postema. Although the PLLA fiber produced by Postema had high tenacity, the process and product requires ultra-high molecular weight poly(L-lactic acid) and a high dilution of the PLLA which negatively affect upscaling and economic feasibility of such a process.

A high-strength polylactic acid elongated object is herein understood to mean an object comprising high molecular weight (HMW) or ultra-high molecular weight (UHMW) polylactic acid (PLA) having an intrinsic viscosity (IV, as measured in chloroform at 25° C.) of at least about 4 dL/g (HMWPLA), the elongated object having a tenacity of at least 0.3 N/tex, preferably at least 0.4 N/tex. Such high-strength elongated objects have a properties profile that make them an interesting material for use in various products, like ropes and cords, mooring lines, fishing nets, sports equipment, fabrics, medical applications, and composites.

Within the context of the present invention an elongated object is understood to be an elongated body having cross-sectional dimensions much smaller than its length. Typical elongated objects are filaments, fibres, straps, strips, tapes, films or tubes, the elongated object is understood to be a continuous object; that is being of virtually indefinite length. The elongated object may have cross-sections of various geometrical or irregular shapes.

It is well known in the field of spinning of high-strength filaments from a polymer that with increasing molecular weight of the polymer tenacity or tensile strength of the filaments are increased. FIG. 1 confirms the said increase in tenacity with increasing intrinsic viscosity for literature reported filaments by showing highest tenacity data for filaments, as collected from open literature (Table 1) and plotted versus the intrinsic viscosities of the PLA from which they have been produced. It is thus concluded that the attainable tenacity of a filament scales with the intrinsic viscosity.

It is furthermore well known, that spinning and drawing of high-strength PLA objects becomes increasingly difficult the higher the molecular weight, and intrinsic viscosity, of the employed polylactic acid. For a PLA filament spinning process to be commercially viable on industrial scale, it is important that such process can be run continuously without interruptions and with high throughput rate and a minimum of solvent recycling. In many of the above-mentioned documents process conditions are applied and product properties are achieved that render them commercially unattractive. There is thus an industrial need for PLA filaments showing improved performance, like improved tensile properties. More specifically therefore, there is a need for a process that enables production of such higher tensile strength filaments on industrial scale.

DETAILED DESCRIPTION

According to the present invention, this is provided by a process characterized in that in the step of cooling (also called quenching) the fluid elongated object, the cooling medium has a temperature ($T_q$) of less than 0° C.

With the process according to the invention PLA elongated objects could be manufactured that for an intrinsic viscosity of the PLA have higher tenacities than known gel-spun PLA elongated objects; Accordingly the invention is also related to a gel-spun elongated object having a tensile strength in N/tex of at least 0.146 times the IV in dL/g of the PLA it comprises.

It is surprising that the process according to the invention results in elongated objects with tensile properties unmatched hitherto in respect to the intrinsic viscosity of the employed PLA.

Another advantage of the process according to the invention is that the process can be operated with PLA concentrations in the solution substantially higher than the concentrations reported in literature thus far. Furthermore the process can readily be scaled up to a commercial scale, providing PLA filaments or PLA multifilament yarns at an attractive rate.

Figure 1:
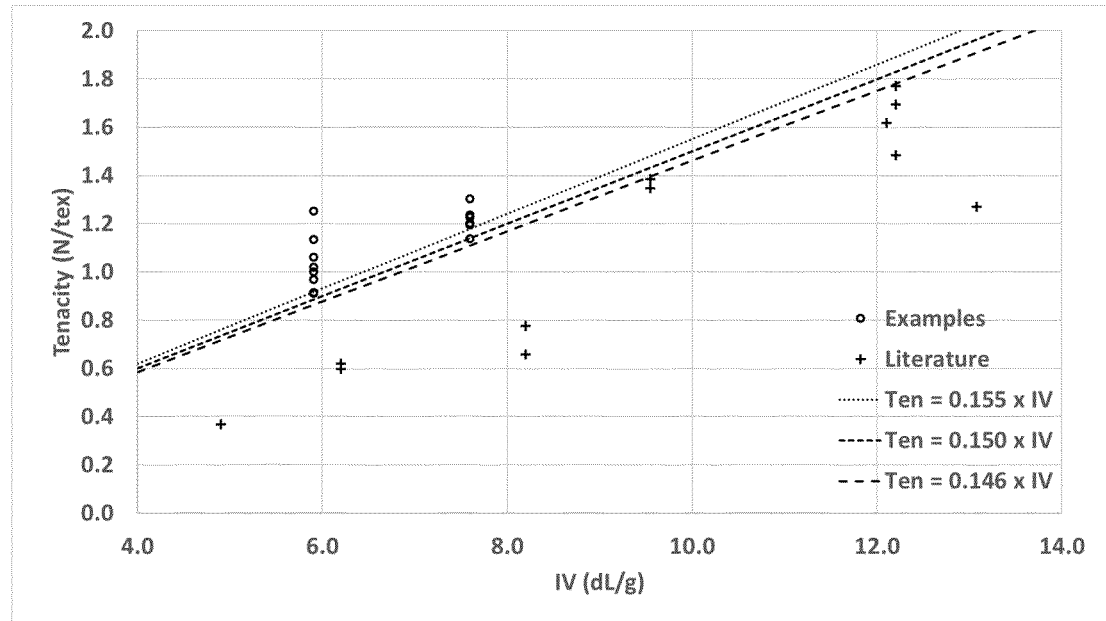
FIG. 1 is a graph of tenacity (N/tex) versus intrinsic viscosity (dL/g) which confirms an increase in tenacity with increasing intrinsic viscosity for literature reported PLA filaments by showing highest tenacity data for filaments, as collected from open literature (Table 1 below) and plotted versus the intrinsic viscosities of the PLA from which they have been produced.
Figure 2:
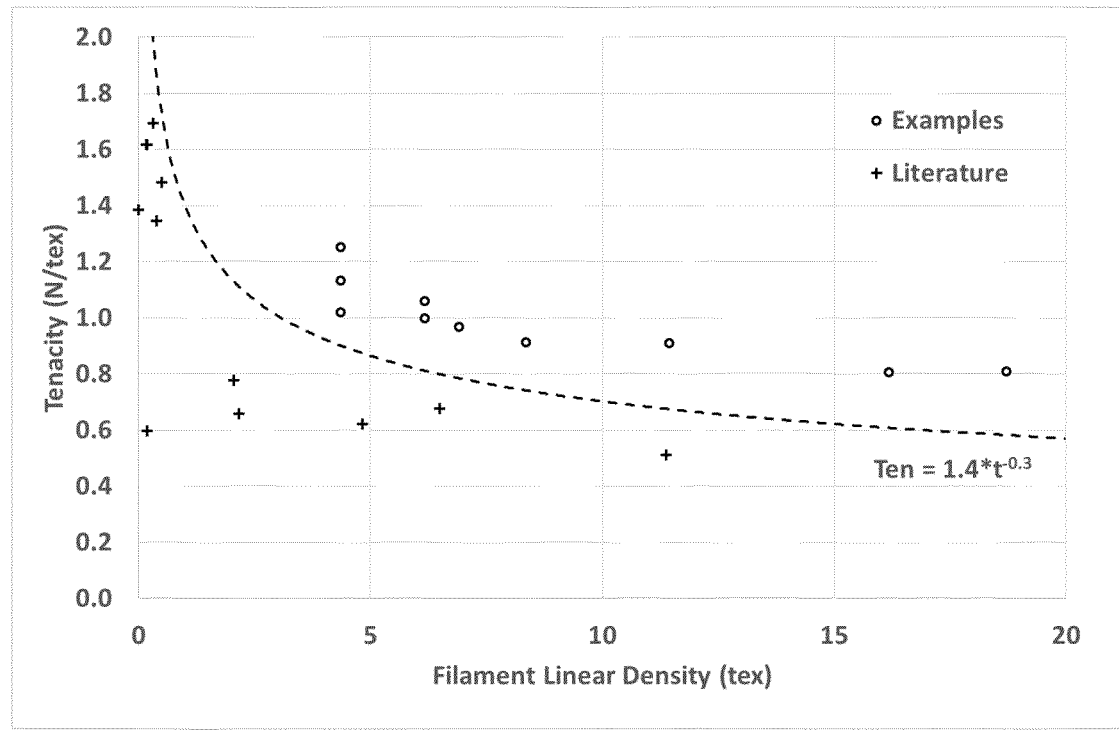
FIG. 2 is a graph of tenacity (N/tex) versus flaimnet linear density (tex) which confirms the reduction of tenacities with increasing filament titer of both gel and melt-spun filaments reported in literature (Table 1 below).

Spinning PLA in the melt is also well known and reported amongst others by Eling et al. (Polymer, Vol.23, 1587-1593, 1982). Although such work provides processes to be efficiently operated at commercial scale by providing filaments of relatively high filament linear density (FLD), also often called filament titer, at acceptable throughput, the thereby obtained filaments have tenacities substantially inferior to filaments produced by the afore mentioned gel-spinning process. FIG. 2 confirms the reduction of tenacities with increasing filament titer of both gel and melt-spun filaments reported in literature (Table 1). Such filaments do hence not fulfil the need of high strength PLA. There remains thus an industrial need for PLA filaments with improved tensile properties.

With the process according to the invention a PLA elongated object can be obtained that for a given filament titer have higher tenacities than any known gel- or melt-spun PLA elongated object to date. Accordingly one embodiment of the invention concerns a gel-spun elongated object comprising a PLA with an IV in the range of 4-40 dl/g, and having a tenacity (Ten, in N/tex) and a filament titer (t, in tex) such that $Ten \geq 1.4*t^{-0.3}$.

By polylactic acid (PLA) in the context of the present application is understood polyesters comprising monomeric units derived from lactic acid. Preferably PLA comprises at least 90 mol % preferably at least 95 mol %, more preferably 98 mol % of monomeric units derived from lactic acid whereby most preferably substantially all monomeric units are derived from lactic acid. Derived from lactic acid herein characterizes the building blocks of the polymer and is not a limitation of the manufacturing process of the PLA, which might for example be obtained by polymerization of lactates or lactide. Lactic acid with the chemical structure $CH_3$-CH(OH)COOH has a carbon atom with 4 distinct substituents. Accordingly it is available in two enantiomeric forms namely L-lactic acid and D-lactic acid, whereby L-lactic acid is the form predominantly occurring in nature. PLA may thus comprise one or both enantiomers in equal or different amounts. In the context of the present invention it was observed that the spinning process is positively affected by the increased presence of one of the enantiomers at the detriment of the other. A preferred embodiment of the present invention concerns a PLA elongated object and a process to manufacture a PLA elongated object wherein the lactic acid monomeric units of the PLA have an enantiomeric excess, abbreviated EE, of at least 80%, preferably at least 85%, more preferably at least 90%, even more preferably at least 95% and most preferably at least 98%, whereby the enantiomeric excess is the difference between molar percentages of the 2 enantiomers, whereby a racemic mixture (50:50) has an EE of 0% an enantiomeric pure compound an EE of 100%. In a yet preferred embodiment L-lactic acid is present in the PLA of the invention in excess of D-lactic acid such that the polylactic acid comprises at least 90 mol %, preferably at least 95 mol %, more preferably at least 98 mol % of monomeric units derived from L-lactic acid, most preferably the polylactic acid is poly-L-lactic acid (PLLA).

In a further embodiment of the invention the polylactic acid applied in the process and present in the elongated object according to the invention is a mixture of poly-D-lactic acid (PDLA) and poly-L-lactic acid, wherein both the D and L polylactic acid have each an enantiomeric excess of at least 80, preferably 95 and most preferably at least 98%. Preferably PLLA and PDLA are present in a mass ratio PLLA/PDLA of between 0.2 to 5, preferably 0.5 to 2, more preferably 0.8 to 1.25, even more preferably 0.95 to 1.05 and most preferably 0.99 to 1.01. The presence of both PDLA and PLLA in the PLA of the process or the elongated object of the invention provide an improved spinning process due to an increased speed of crystallization of the gel elongated object as well as an increased heat resistance and melting point of the obtained elongated object.

The polylactic acid applied in the process and present in the elongated object according to the invention has an intrinsic viscosity (IV) of at least 4 dL/g. Preferably the IV of the PLA is in the range of 4-40 dL/g, more preferably in the range of 4 -30, more preferably in the range of 5-20 dL/g, even more preferably in the range of 5-15 dL/g, even more preferably in the range of 5 to 12 dL/g and most preferably in the range of 5 to 10 dL/g, to provide a balance between processability of the solution to be spun and mechanical properties of the obtained elongated objects. Intrinsic viscosity is a measure for molar mass (also called molecular weight) that can more easily be determined than actual molar mass parameters like $M_n$, $M_v$ or $M_w$. There is an empirical relation known from literature between IV and $M_v$, but such relation may be dependent on molar mass distribution. Based on the equation $IV=5.45 \times 10^{-4} M_v^{0.73}$ (Leenslag et al. Polymer, Vol. 28, 1695-1702, 1987) an IV of 4 or 10 dL/g would be approximately equivalent to $M_v$ of about 200 or 700 kg/mol, respectively. It is well-known that during processing of a polymer at elevated temperature generally some degradation occurs, leading to a lower molar mass of the product obtained versus that of the starting polymer. In the present study it was found that upon gel spinning PLA the IV may drop by a minor extent, if at all, resulting in an IV loss of the final product by about 0 to 3 dL/g, depending on starting molar mass and processing conditions.

Preferably, the PLA is a homopolymer of L- or D-lactic acid monomeric units but the PLA may also comprise small amounts of the other lactic acid enantiomer or even of other monomeric units amongst which hydroxy-acid derived units like hydroxy acetic acid, 3-hydroxy propionic acid, 2-hydroxy butanoic acid, 3-hydroxy butanoic acid, 4-hydroxy butanoic acid or 6-hydroxy adipic acid and its regioisomers as well as mixtures thereof. By small amounts is herein understood between 0.1 and 20 mol %, preferably 0.5 to 15 mol % and more preferably between 1 and 10 mol % of monomeric units in relation to the total amount of monomeric units in the polymer. The presence of further monomeric units may increase the elasticity, i.e. elongation at break, of the PLA elongated object.

Preferably, the PLA is a linear polymer with less than one branch per 100 monomeric units, and preferably less than one branch per 300 monomeric units. Within this application a branch is considered to be a side chain comprising at least one hydroxy-acid monomer unit. A suitable way to introduce such branches in the PLA is the further introduction of multifunctional monomeric units having more than one of each acid and/or hydroxyl functionality in the monomeric unit.

In the process according to the invention any of the known solvents suitable for gel spinning PLA can be used as solvent for making the PLA solution. It is found that the present process is especially advantageous when applying relatively low volatile solvents, i.e. solvents having a boiling point at atmospheric conditions of higher than 200° C., more preferably higher than 225 or 250° C.

It was observed that the process of the invention can be further improved by an adequate selection of a cooling medium, especially a solvent or solvent mixture. A selection criterion of the cooling medium may be the limiting activity coefficient ($\gamma^\infty$) calculations via the group contribution theory as a simplified model. The calculations of $\gamma^\infty$ are based on the molecular resemblance, according to the main interaction group of PLA. It was discovered that very good solvents for PLA such as chloroform associate with PLA and thereby have negative impact on the spinning process, whereas less good solvents lead to a more drawable filament structure. On the other hand, too high a limiting activity coefficient within the temperature range considered for PLA also negatively impacts the solution spinning. Such solvents lack interaction forces with the functional groups of PLA; therefore, they are poor solvents for PLA. A good balance of solubility performance and hence advantageous for the solution spinning process of PLA has been identified amongst others for cooling medium, e.g. solvents, like N-methyl pyrolidone (NMP), toluene, dimethyl formamide (DMF), phenyl propyl ketone, anisole, acetophenone, benzylacetate, ethylacetate, chloroform, dimethoxybenzene. Therefore a preferred embodiment of the invention relates to a process wherein the cooling medium, e.g. a solvent or solvent mixture, is used having a limiting activity coefficient (activity coefficient at infinite dilution) according to Modified Separation of Cohesive Energy Density Model (MOSCED), which is a combination of Hansen and Hildebrand solubility model at a temperature of between 90-190° C., preferably 100° C. and 160° C., most preferably between 120° C. and 150° C., of between 1 and 2, preferably between 1.1 and 1.8 and most preferably between 1.3 and 1.6. Other parameters like purity, hygroscopicity, reactivity, industrial availability, environment and health issues may be considered and could result in a preferred selection of solvents being acetophenone and anisole or mixtures thereof.

In performing the process according to the invention the solution of PLA in solvent can be made using known methods. Preferably, a twin-screw extruder is applied to make a homogeneous solution from a PLA/solvent slurry. The solution is preferably fed to the spinplate at constant flow rate with metering pumps. The concentration of the PLA solution ($c_P$) is between 5 and 50 mass %, whereby mass % is calculated as the mass of PLA per total mass of solution. Preferably the PLA solution has a concentration of between 6 and 40 mass %, preferably between 8 and 30 mass % and most preferably between 10 and 25 mass %, with lower concentrations being preferred the higher the molar mass of the PLA is.

Preferably, the concentration, $c_P$, is between 10 and 25 mass % for PLA with IV in the range 5-15 dL/g.

The PLA solution is preferably of substantially constant composition over time, because this further improves processing stability and results in elongated objects of more constant quality over time. With substantially constant composition it is meant that parameters like PLA chemical composition and molar mass, and concentration of PLA in the solution vary only within a certain range around a chosen value.

The PLA solution should have a low moisture content to limit hydrolytic degradation of PLA during storage and spinning of the solution. Low water content of the solution can be obtained by pre-drying the individual components of the solution or drying the solution itself. Preferably a non-hygroscopic solvent is employed.

According to the invention, the PLA solution is formed into at least one individual elongated object by spinning said solution through a spinning plate containing at least one spin-hole. Preferably, the spinning plate contains at least 5 spin-holes, more preferably at least 25 spinholes. In a preferred embodiment, each spin-hole of the spinning plate has a geometry comprising at least one contraction zone. By contraction zone is herein understood a zone with a gradual decrease in diameter with a cone angle of preferably below 60°, more preferably below 50°, even more preferably below 40°, from an initial diameter $D_0$ to a final diameter $D_n$ such that a draw ratio $DR_{sp}$ is achieved in the spin-hole. Preferably, the spin-hole further comprises upstream and/or downstream of the contraction zone, a zone of constant diameter. If a downstream zone with constant diameter is present, often called capillary, such a zone preferably has a length/diameter ratio $L_n/D_n$ of between 1 and 50.

Preferably, the step of spinning of the solution through a spinplate is carried out at a spinning temperature above the melting point and below the boiling point of the solvent, more preferably between 100° C. and 250° C. If for example acetophenone is used as solvent the spinning temperature is preferably at most 200° C., more preferably at most 180° C., even more preferably at most 160° C. and preferably at least 100° C., more preferably at least 110° C., most preferably at least 120° C.

Preferably, the fluid elongated object issues from the spin-hole into an air-gap and then into a quench zone, said air-gap having a length of preferably between 1 mm and 50 mm, more preferably between 2 mm and 30 mm, even more preferably between 2 mm and 20 mm, most preferably between 2 mm and 5 mm. Although called air-gap, said gap can be filled with any gas or gaseous mixture, e.g. air, nitrogen or other inert gases. By air-gap is herein understood the distance between the spinning plate and the quench zone. In the process according to the invention the fluid elongated objects can be drawn upon leaving the spin hole, keeping the fluid elongated object under sufficient tension and preventing relaxation by applying a higher pick-up rate after cooling the elongated object, than the flow rate upon leaving the spinhole. This stretching applied before gelling or solidification upon cooling is called the draw ratio in the air-gap $DR_{ag}$, and is in prior art also referred to as draw down or jet draw, and is typically of between 1 and 20, more preferably between 1.5 and 10, most preferably between 2 and 8.

The combination of the two optional draw ratios applied in the spin plate and in the airgap $DR_{sp}$ and $DR_{ag}$ can be combined to the fluid draw ratio $DR_{fluid}$ (calculated by $DR_{sp} \times DR_{ag}$) which expresses the extension applied to the PLA solution in its fluid stage.

In a preferred embodiment the cooling medium is a fluid, preferably a liquid and most preferably water or an organic solvent comprising alcohol, ketone, ether or esters functional groups or combinations of such solvents or functional groups such as a 40:60 m/m water:ethylene glycol. Preferably the cooling medium is immiscible with the solvent or solvent mixture of the PLA gel elongated object and a non-solvent for PLA. Cooling of the fluid elongated object into a solvent-containing gel elongated object may be performed with a gas flow, or by quenching the elongated object in said liquid cooling medium directly or after passing an air-gap, the bath preferably containing a non-solvent for the PLA solution. If gas cooling is applied, the air-gap is the length in air before the elongated object is gelled. Preferably a liquid quench-bath is applied in combination with an air-gap, the advantage being that drawing and cooling conditions are better defined and controlled than by gas cooling. Although called air-gap, the atmosphere can be different than air; e.g. as a result of an inert gas like nitrogen flowing, or as a result of solvent evaporating from elongated objects. Preferable, there is no forced gas flow, or only of low flow rate. In a preferred embodiment, the elongated object is quenched in a bath containing a cooling liquid, which liquid is not miscible with the solvent, the temperature of which is controlled, and which flows along the elongated objects at least at the location where the fluid elongated objects enter the quench bath.

It was observed that the spinning process for the PLA elongated objects was further improved when the temperature of the cooling medium was further reduced to temperatures $T_q$ of less than $-5°$ C., more preferably less than $-10°$ C., even more preferably less than $-15°$ C. and most preferably less than $-20°$ C. At such lower temperatures gel elongated objects of higher strength tend to be formed, such that they can be handled with fewer breakages.

It was further observed that the inventive process could be optimized by adjusting the temperature $T_q$ of the cooling medium by respecting $$T_q = T_0 \left( \frac{c_P}{50 \text{ mass \%}} - 1 \right),$$

wherein $T_0$ is at least 20° C., more preferably at least 30° C., even more preferably at least 40° C. and most preferably at least 50° C. Processes operated under such temperatures of the cooling medium showed increased robustness and a higher tenacity of the PLA elongated body.

It was observed that the cooling rate of the fluid elongated object, i.e. the speed at which the fluid elongated object is quenched to form a gel elongated object, allows to further optimize the process of the invention. Increased cooling rates may be achieved by several means like lowering the cooling medium temperature, increase cooling medium convection or increase the surface to volume ratio of the elongated object by reducing the dimensions of the object.

After the formation of a gel elongated object by immersion in the cooling medium, the elongated object may be collected and further cooled for enhancing the PLA crystallization process. Alternatively the gel elongated object may continuously be subjected to the at least partial removal of the spinning solvent.

Solvent removal from the gel elongated object to form a solid elongated object may be performed by known methods, for example by evaporation when a relatively volatile solvent is used to prepare the PLA solution, by using an extraction liquid or by a combination of both methods. Suitable extraction liquids are liquids that do not cause significant changes to the PLA network structure of the elongated objects. Preferably, the extraction liquid is chosen such that the solvent can be separated from the extraction liquid for recycling such as ethanol.

The process for making a PLA elongated object according to the invention further comprises, in addition to the optional drawing of the solution elongated object, drawing the elongated objects in at least one drawing step performed on the gel elongated object and/or on solid elongated object after cooling and at least partial removal of solvent, with a draw ratio $DR_{solid}$ of at least 2. Preferably, drawing is performed in more than two steps, and preferably at different temperatures with an increasing profile between about 120 and 220°

C. A 2-step draw ratio applied on (semi-) solid elongated objects is represented as $DR_{solid} = DR_{solid\ 1} * DR_{solid\ 2}$; i.e. it is composed of the draw ratios applied in each drawing step. It is found that a draw ratio $DR_{solid}$ of upto about 35 can be applied, to optimize tensile properties of the elongated article. As a result of improved drawability and strength of partly drawn elongated objects in the process according to the invention, relatively high draw ratios, preferably in the range 5-30, may be applied without frequent breakage occurring, also depending on the applied draw ratio on fluid elongated objects.

In a preferred embodiment of the process of the invention the total draw ratio of the elongated object ($DR_{total}$) is at least 5, preferably at least 7 and most preferably at least 10, wherein $DR_{total} = DR_{fluid} \times DR_{solid}$.

The process according to the invention may further comprise additional steps known in the art, like for example applying a spin finish or sizing agent to the elongated object.

The invention further relates to a gel-spun elongated object, obtainable by the process according to the invention, the elongated object showing higher tensile strength than any known PLA filament for a given IV of the PLA. More specifically the gel-spun elongated object according to the invention comprises a PLA with an IV in the range of 4-40 dl/g, and has a tenacity in N/tex measured according to ISO 5079 of at least $f_1*$IV, wherein factor $f_1$ is 0.146 (N/tex).(g/dL), preferably $f_1$ is 0.148, more preferably 0.150, even more preferably 0.155 and most preferably f is 0.160. The tenacity of the elongated object is not specifically limited, nevertheless the factor $f_1$ may have an upper limit of 0.30, preferably 0.25 (N/tex).(g/dL).

In a further embodiment of the invention, the gel-spun elongated object comprises a PLA with an IV in the range of 4-40 dl/g, and has a tenacity in N/tex (Ten) measured according to ISO 5079 and a filament titer in tex (t) such that Ten$\geq f_2* $ $t^{-0.3}$, wherein factor $f_2$ is 1.40 N.tex$^{-0.7}$, preferably $f_2$ is 1.45, more preferably 1.50, even more preferably 1.60 and most preferably $f_2$ is 1.70. In an alternative embodiment said tenacity respects the condition that Ten$\geq f_3*t^{-1/3}$, wherein factor $f_3$ is 1.60 N.tex$^{-2/3}$, preferably $f_3$ is 1.65, more preferably 1.70, even more preferably 1.80 and most preferably $f_3$ is 1.90. Filaments and yarns comprising such filaments are especially economically attractive since allowing a production on commercial scale while providing filaments and yarns with high tenacities.

The invention also relates to gel-spun elongated object respecting more than one of the above tenacity relations. Furthermore elongated objects of the invention not only have a high tenacity but may also have an elongation at break superior to many other industrial high tenacity fibers. Specifically the elongated objects according to the invention may have an elongation at break of at least 10%, preferably at least 15% and more preferably at least 20% (measured according to ISO 5079). The elongated objects of the invention have physical properties making them useful for various applications in articles. Accordingly an embodiment of the invention concerns articles containing the gel-spun elongated object of the invention. Preferably said articles are yarns, ropes, fishing lines, fishing nets, cargo nets and curtains, kite lines, tennis racket strings, canvas, non-woven fabrics, webbings, hoses, cut and stab resistant articles, protective gloves, sport equipment, helmets, sails, geotextiles or medical devices.

The invention further relates to medical devices comprising the inventive elongated objects. In a preferred embodiment, the medical device is a cable or a suture, preferably used in implants. Other examples include mesh, endless loop products, bag-like or balloon-like products, but also other woven and/or knitted products. Good examples of cables include a trauma fixation cable, a sternum closure cable, and a prophylactic or per prosthetic cable, long bone fracture fixation cable, small bone fracture fixation cable. Also tube-like products for e.g. ligament replacement are suitably manufactured from the inventive elongated object. Such products made from the inventive elongated objects show an efficient ratio between their load carrying surface and their surface exposed to the human or animal body. It was further observed that the inventive yarns may be less prone to infestation and good resorption properties.

The present invention is described further in detail referring to examples.

Methods

Intrinsic Viscosity (IV) is determined based on ASTM-D2857-95 (2007) at 25° C. in chloroform, the dissolution time being 48 hours, by extrapolating the viscosity as measured at different concentrations to zero concentration. For the calculation of the IV of literature reported polymers the commonly accepted empirical relation $IV=5.45 \times 10^{-4} M_v^{0.73}$ is employed.

Tensile properties: tenacity and elongation at break (or eab) are defined and determined on monofilament fiber with a procedure in accordance with ISO 5079:1995, using a Textechno's Favimat (tester no. 37074, from Textechno Herbert Stein GmbH & Co. KG, Monchengladbach, Germany) with a nominal gauge length of the fibre of 50 mm, a crosshead speed of 25 mm/min and clamps with standard jaw faces (4*4 mm) manufactured from Plexiglas® of type pneumatic grip. The filament was preloaded with 0.004 N/tex at the speed of 25 mm/min. For calculation of the tenacity the tensile forces measured are divided by the filament linear density (titer); values in GPa are calculated assuming a density of 1.29 g/cm$^3$;

Linear density: Determination of the linear density of monofilaments was measured according to ASTM D1577-01, carried out on a semiautomatic, microprocessor controlled tensile tester (the Favimat, tester no. 37074, from Textechno Herbert Stein GmbH & Co. KG, Monchengladbach, Germany). A representative length of the monofilament to be tested was cut from said monofilament with a sharp blade, clamped with two small pieces of paper (4×4 mm) between two (4×4×2 mm) jaw faces manufactured from Plexiglas®. The length was enough to ensure a good mounting of the monofilament and was about 70 mm.

The linear density of the monofilament length between the clamp jaws is determined vibroscopically as described above by following the routines implemented in the tester's software and described in the tester's manual. The distance between the jaws during measurements is kept at 50 mm, the monofilament being tensioned at 0.06 N/tex with a speed of 2 mm/min.

Spinning Process 1

A first series of experiments were performed whereby solutions with varying concentration of a PLLA homopolymer with an IV of 5.9 dL/g (chloroform, 25° C.) in acetophenone or anisole were extruded with a 9 mm co-rotating twin screw extruder equipped with a gear-pump through a spinplate at a temperature setting of 150° C. having 1 spinhole into air at 20° C. with an extrusion rate of 2.5 cc/min. The spinhole had an initial cylindrical channel of 3.0 mm diameter and L/D of 10, followed by a conical contraction with a cone angle 15° into a cylindrical channel of 0.8 mm diameter and L/D of 10. The solution filaments were quenched in an ethylene glycol/water (60/40 mass/mass) bath set at varying temperatures and taken-up at such rate that a draw ratio of 1 was applied to the as-spun filaments in the air-gap of about 40 mm and collected by winding on a cylinder. In some experiments the quenched filaments could not be collected due to low gel-filament integrity. The PLLA gel-filaments were subsequently solvent extracted in ethanol for 24 hours and dried for 24 hours under ambient conditions. The solvent free filaments subsequently entered a 1 m long oven at 120° C. to be stretched at a draw ratio 3. The filaments were stretched a second time at 140° C. by applying a draw ratio of about 2 and further stretched a third time at 160° C. to a total draw ratio. Relevant data for different experiments is shown in Table 2.

Spinning Process 2

A second series of experiments were performed whereby solutions with varying concentration of a PLLA homopolymer with an IV of 7.6 dL/g (chloroform, 25° C.) in acetophenone were extruded with a Fourne plunger type extruder through a spinplate at a temperature setting of 120° C. having 1 spinhole into air at 20° C. with an extrusion rate of 0.1 cc/min. The spinhole had an initial diameter of 3.0 mm diameter with a conical contraction with a cone angle 15° into a cylindrical channel of 0.2 mm diameter and L/D of 3. The solution filaments were quenched in an ethylene glycol/water (60/40 mass/mass) bath set at varying temperatures and taken-up at such rate that a draw ratio of 1 was applied to the as-spun filaments in the air-gap of about 40 mm and collected by winding on a cylinder. The PLLA gel-filaments were subsequently solvent extracted in ethanol for 24 hours and dried for 24 hours under ambient conditions. The solvent free filaments subsequently entered a 1 m long oven at 120° C. to be stretched at a draw ratio 3. The filaments were stretched a second time at between 140-150° C. by applying a draw ratio of about 2 and further stretched a third time at between 160-175° C. to the total draw ratio as reported in Table 3.

TABLE 1

| Literature | IV reported dL/g | Tenacity N/tex | Filament titer tex |
|---|---|---|---|
| Eling 1982 | 3.9 | 0.39 | 29.28 |
| | 4.9 | 0.37 | n.a. |
| | 6.2 | 0.62 | 4.82 |
| | 6.2 | 0.60 | 0.18 |
| | 8.2 | 0.78 | 2.05 |
| | 8.2 | 0.66 | 2.17 |
| Leenslag 1987 | 9.5 | 1.38 | n.a. |
| | 9.5 | 1.35 | 0.39 |
| | 12.1 | 1.62 | 0.17 |
| | 12.1 | 1.62 | 0.18 |
| | 13.1 | 1.27 | n.a. |
| Postema 1989 | 12.2 | 1.77 | n.a. |
| Postema 1990 | 12.2 | 1.69 | 0.31 |
| | 12.2 | 1.48 | 0.49 |
| Fambri 1997 | 2.8 | 0.67 | 6.48 |
| | 2.8 | 0.51 | 11.38 |

TABLE 2

| Exp. | Solvent | IV dL/g | $c_P$ mass % | $T_q$ | DR | Ten N/tex | EAB % | Filament titer tex |
|---|---|---|---|---|---|---|---|---|
| 1 | Acetophenone | 5.9 | 10 | 5° C. | — | | | |
| 2 | Acetophenone | 5.9 | 33 | −15° C. | 12 | 0.63 | 14.3 | 15.2 |
| 3 | Acetophenone | 5.9 | 15 | −30° C. | 17 | 1.25 | 18.8 | 4.36 |
| 4 | Acetophenone | 5.9 | 15 | −30° C. | 17 | 1.13 | 16.3 | 4.36 |
| 5 | Acetophenone | 5.9 | 19 | −30° C. | 15 | 1.06 | 16.9 | 6.18 |
| 6 | Acetophenone | 5.9 | 15 | −30° C. | 17 | 1.02 | 15.7 | 4.36 |
| 7 | Acetophenone | 5.9 | 20 | −30° C. | 17 | 1.00 | 15.1 | 6.18 |
| 8 | Acetophenone | 5.9 | 22 | −30° C. | 17 | 0.97 | 16.4 | 6.91 |
| 9 | Acetophenone | 5.9 | 16 | −30° C. | 10 | 0.91 | 15.8 | 8.36 |
| 10 | Anisole | 5.9 | 15 | 5° C. | — | | | |
| 11 | Anisole | 5.9 | 22 | −30° C. | 18 | 0.91 | 17.3 | 11.45 |
| 12 | Anisole | 5.9 | n.a. | −30° C. | 19 | 0.81 | 17.8 | 18.73 |
| 13 | Anisole | 5.9 | n.a. | −30° C. | 16 | 0.80 | 17.3 | 16.18 |

TABLE 3

| Exp. | Solvent | IV dL/g | $c_P$ mass % | $T_q$ | DR | Ten N/tex |
|---|---|---|---|---|---|---|
| 14 | Acetophenone | 7.6 | 22 | −30° C. | 7.5 | 1.14 |
| 15 | Acetophenone | 7.6 | 20 | −30° C. | 6 | 1.19 |
| 16 | Acetophenone | 7.6 | 15 | −30° C. | 6 | 1.23 |
| 17 | Acetophenone | 7.6 | 15 | −30° C. | 6 | 1.22 |
| 18 | Acetophenone | 7.6 | 20 | −30° C. | 10.5 | 1.20 |
| 19 | Acetophenone | 7.6 | 20 | −30° C. | 10.5 | 1.30 |

The invention claimed is:

1. A process for making a polylactic acid (PLA) elongated object comprising the steps of:
   a) making a solution of PLA having an intrinsic viscosity (IV) measured in chloroform at 25° C. of at least 4 dL/g, in a solvent, wherein the solution has a concentration $cc_P$ of 5 to 50 mass% expressed as the mass of the PLA per total mass of the solution;
   b) spinning the solution through a spinplate comprising at least 1 spinhole to form a fluid elongated object;
   c) optionally applying a draw ratio $DR_{fluid}$ to the fluid elongated object;
   d) contacting the fluid elongated object with a cooling medium having a temperature $T_q$ of less than 0° C. to form a solvent-containing gel elongated object;
   e) removing at least partly the solvent from the gel elongated object to form a solid elongated object; and
   f) drawing the elongated object in at least one step before, during and/or after step e), while applying a draw ratio ($DR_{solid}$) of at least 2, to form a PLA elongated object.

2. The process according to claim 1, wherein $T_q$ is less than −5° C.

3. The process according to claim 1, wherein $$T_q = T_0 \left( \frac{c_P}{50 \text{ mass \%}} - 1 \right),$$

where
$T_0$ is at least 20° C.

4. The process according to claim 1, wherein the polylactic acid has an intrinsic viscosity in a range of 5 to 15 dL/g.

5. The process according to claim 1, wherein the polylactic acid comprises at least 90 mol% of monomeric units derived from L-lactic acid.

6. The process according to claim 1, wherein the total draw ratio of the elongated object ($DR_{total}$) is at least 5.

7. The process according to claim 1, wherein the PLA solution has a concentration $c_P$ of between 6 and 40 mass%.

8. The process according to claim 1, wherein the cooling medium is a fluid.

9. The process according to claim 1, wherein the cooling medium has limiting activity coefficient measured at a temperature of between 90-190° C. of between 1 and 2.

10. A gel-spun polylactic acid elongated object obtained by the process according to claim 1.

11. A gel-spun polylactic acid elongated object which comprises a polylactic acid (PLA) with an IV in a the range of 5-15 dL/g, and having a tenacity (Ten) measured according to ISO 5079 in N/tex such that Ten≥$f_1$* IV, wherein factor $f_1$ is 0.150.

12. The gel-spun polylactic acid elongated object according to claim 11, wherein the object has an elongation at break of at least 10%, measured according to ISO 5079.

13. The gel-spun polylactic acid elongated object according to claim 11, wherein the elongated object is a filament, a fibre, a strap, a strip, a tape, a film or a tube.

14. The gel-spun polylactic acid elongated object according to claim 11, wherein the factor $f_1$ is 0.155.

15. The gel-spun polylactic acid elongated object according to claim 11, wherein the factor $f_1$ is 0.160.

16. An article containing the gel-spun polylactic acid elongated object of claim 11, wherein the article is selected from the group consisting of yarn, rope, fishing line, fishing net, cargo nets and curtains, kite lines, tennis racket strings, canvas, non-woven fabrics, webbings, hoses, cut resistant articles, and stab resistant articles, protective gloves, sport equipment, helmets, sails, geotextiles, membranes and medical devices.

17. A gel-spun polylactic acid elongated object which comprises a polylactic acid (PLA) with an IV in a range of 5-15 dL/g, and having a tenacity in N/tex (Ten) measured according to ISO 5079 and a filament titer in tex (t) such that Ten≥$f_2$* $t^{-0.3}$, wherein factor $f_2$ is 1.40 N.tex$^{-0.7}$.

18. The gel-spun polylactic acid elongated object according to claim 17, wherein the factor $f_2$ is 1.50.

19. The gel-spun polylactic acid elongated object according to claim 17, wherein the factor $f_2$ is 1.60.

20. The gel-spun polylactic acid elongated object according to claim 17, wherein the factor $f_2$ is 1.70.

* * * * *